United States Patent
Bae et al.

(10) Patent No.: US 12,486,396 B2
(45) Date of Patent: Dec. 2, 2025

(54) POLY(BUTYL ACRYLATE)-BASED COMPOSITION FOR ELECTROCHROMIC DEVICE HAVING TRANSPARENCY AND ELASTICITY AND MANUFACTURING METHOD OF ELECTROCHROMIC MEMBER

(71) Applicant: KOREA UNIVERSITY OF TECHNOLOGY AND EDUCATION INDUSTRY-UNIVERSITY COOPERATION FOUNDATION, Cheonan-si (KR)

(72) Inventors: Jin Woo Bae, Gyeonggi-do (KR); Seung Ju Oh, Cheonan-si (KR)

(73) Assignee: KOREA UNIVERSITY OF TECHNOLOGY AND EDUCATION INDUSTRY-UNIVERSITY COOPERATION FOUNDATION, Cheonan-si (KR)

(*) Notice: Subject to any disclaimer, the term of this patent is extended or adjusted under 35 U.S.C. 154(b) by 10 days.

(21) Appl. No.: 18/020,434

(22) PCT Filed: Dec. 8, 2021

(86) PCT No.: PCT/KR2021/018513
§ 371 (c)(1),
(2) Date: Feb. 9, 2023

(87) PCT Pub. No.: WO2023/063491
PCT Pub. Date: Apr. 20, 2023

(65) Prior Publication Data
US 2024/0270954 A1     Aug. 15, 2024

(30) Foreign Application Priority Data

Oct. 14, 2021 (KR) ............... 10-2021-0136309

(51) Int. Cl.
*G02F 1/1516* (2019.01)
*C08K 5/132* (2006.01)
(Continued)

(52) U.S. Cl.
CPC ............. *C08L 33/08* (2013.01); *C08K 5/132* (2013.01); *C08K 5/3725* (2013.01); *C09K 9/02* (2013.01);
(Continued)

(58) Field of Classification Search
CPC .................... G02F 1/1516; G02F 1/15165
See application file for complete search history.

(56) References Cited

FOREIGN PATENT DOCUMENTS

| JP | 2004-533702 A | 11/2004 | |
| JP | 10-1914393 | * 11/2018 | ............ G02F 1/15 |

(Continued)

OTHER PUBLICATIONS

International Search Report of PCT/KR2021/018513 mailed Jun. 24, 2022.

*Primary Examiner* — Joseph P Martinez
(74) *Attorney, Agent, or Firm* — Revolution IP, PLLC

(57) ABSTRACT

The present invention relates to a poly(butyl acrylate)-based composition for an electrochromic device having transparency and elasticity and a manufacturing method of an electrochromic member, wherein the composition for an electrochromic device according to an embodiment of the present invention includes a light-transmitting polymer resin, a cross-linking agent, an initiator, an ionic liquid, and an electrochromic material, wherein the light-transmitting polymer resin is poly(butyl acrylate).

14 Claims, 18 Drawing Sheets

(51) Int. Cl.
  *C08K 5/372* (2006.01)
  *C08L 33/08* (2006.01)
  *C09K 9/02* (2006.01)
(52) U.S. Cl.
  CPC ........ *G02F 1/1516* (2019.01); *C08L 2201/10* (2013.01); *C09K 2211/1007* (2013.01); *C09K 2211/1029* (2013.01)

(56) References Cited

FOREIGN PATENT DOCUMENTS

| | | | | |
|---|---|---|---|---|
| JP | 10-2038495 | * | 10/2019 | ............... G02F 1/15 |
| JP | 10-2019-0127459 | * | 11/2019 | ............... G02F 1/15 |
| JP | 6870306 B2 | | 5/2021 | |
| JP | 2021-121822 A | | 8/2021 | |
| KR | 10-2017-0025612 A | | 3/2017 | |
| KR | 10-1914393 B1 | | 11/2018 | |
| KR | 10-2038495 B1 | | 10/2019 | |
| KR | 10-2019-0127459 A | | 11/2019 | |
| KR | 10-2078481 B1 | | 2/2020 | |
| WO | 2021/075999 A1 | | 4/2021 | |

* cited by examiner

POLY(BUTYL ACRYLATE)-BASED COMPOSITION FOR ELECTROCHROMIC DEVICE HAVING TRANSPARENCY AND ELASTICITY AND MANUFACTURING METHOD OF ELECTROCHROMIC MEMBER

TECHNICAL FIELD

The present invention relates to a poly(butyl acrylate)-based composition for an electrochromic device having transparency and elasticity and a manufacturing method of an electrochromic member.

BACKGROUND ART

An electrochromic device is a device that includes an electrochromic material and has color changes by voltage applied from the outside. Various materials such as polymer compounds and metal oxides are applied to the electrochromic material, and the color is reversibly changed by voltage applied to the electrode.

Recently, such an electrochromic device is more widely used in areas such as a smart window system that blocks external gaze and sunlight, or automotive glass that displays information including maps and letters.

Typical electrochromic devices use a liquid electrochromic material, and thus cause an electrolyte to leak out, and are not applicable as a flexible display. Recently, a solidified water-based electrolyte has been developed, but a protection layer is required to be additionally installed to prevent water from easily evaporating.

As a related prior art document, there is Korean Patent Registration No. 10-2078481.

DISCLOSURE OF THE INVENTION

Technical Problem

The present invention is to provide a composition for an electrochromic device having optical transmission and elasticity, and a manufacturing method of an electrochromic member.

In addition, various colors may be obtained by applying various electrochromic materials.

In addition, the composition for an electrochromic device has moisture resistance and flexibility to be applicable to various fields.

In addition, the manufacturing method is simple to increase production efficiency and reduce manufacturing costs.

Technical Solution

A composition for an electrochromic device according to an embodiment of the present invention includes a light-transmitting polymer resin, a cross-linking agent, an initiator, an ionic liquid, and an electrochromic material, wherein the light-transmitting polymer resin is poly(butyl acrylate).

The cross-linking agent may be polyethylene glycol dimethacrylate, and contained in an amount of 1 to 2 parts by weight with respect to 100 parts by weight of the light-transmitting polymer resin.

The initiator may be 1-hydroxycyclohexyl phenyl ketone, and contained in an amount of 0.5 to 2 parts by weight with respect to 100 parts by weight of the light-transmitting polymer resin.

The ionic liquid may be 1-butyl-3-methylimidazolium bis(trifluoromethylsulfonyl)imide, and contained in an amount of 150 to 250 parts by weight with respect to 100 parts by weight of the light-transmitting polymer resin.

An electrochromic device according to an embodiment of the present invention includes a first electrode, a second electrode, and an electrochromic device layer that is discolored by voltage applied to the first electrode and the second electrode, wherein the electrochromic device layer includes the composition for an electrochromic device described above.

A method of manufacturing an electrochromic member includes mixing a light-transmitting polymer resin, a cross-linking agent, an initiator, an ionic liquid, and an electrochromic material to prepare a mixture.

Advantageous Effects

According to a composition for an electrochromic device and a method of manufacturing an electrochromic member according to embodiments of the present invention, optical transmission and elasticity may be obtained.

In addition, various colors may be obtained by applying various electrochromic materials.

In addition, the composition for an electrochromic device has moisture resistance and flexibility to be applicable to various fields.

In addition, the manufacturing method is simple to increase production efficiency and reduce manufacturing costs.

MODE FOR CARRYING OUT THE INVENTION

Figure 1:
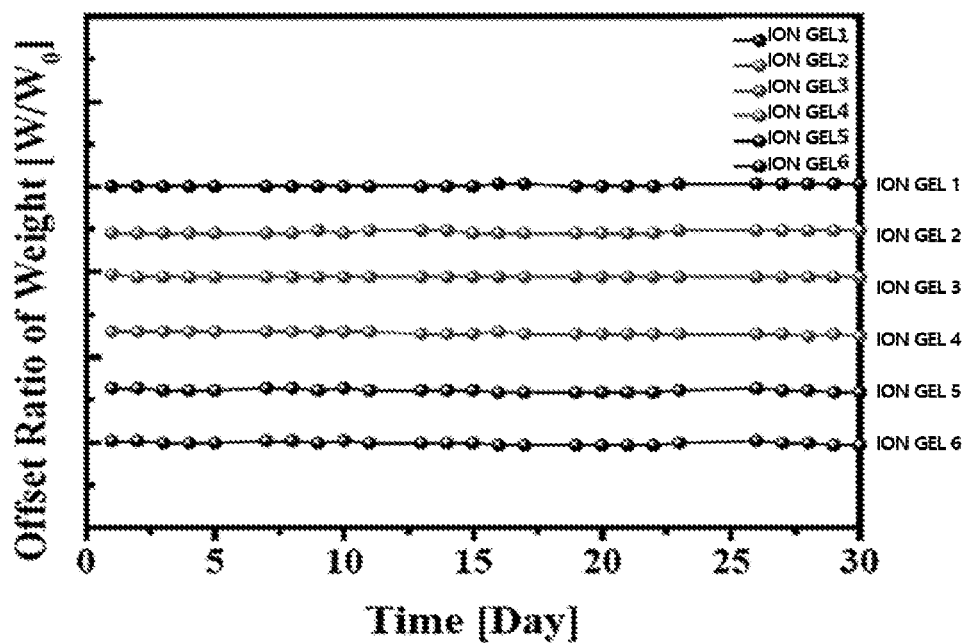
FIG. 1 is an evaporation test result for ion gels 1 to 6.

Hereinafter, preferred embodiments of the present invention will be described as follows with reference to the accompanying drawings. The invention may, however, be embodied in many different forms and should not be construed as being limited to the embodiments set forth herein. In addition, these embodiments of the present invention are provided so that the present invention will be thorough and complete, and will fully convey the scope of the invention to those skilled in the art. Therefore, in the drawings, the shapes and dimensions of elements may be exaggerated for clarity, and the same reference numerals will be used throughout to designate the same or like elements. The same symbol will be used to elements implementing similar function and operation in entire drawings. Moreover, throughout the entire description of the present invention, when one part is said to "include (or comprise)" an element, unless specifically mentioned otherwise, instead of excluding any other element, this may signify that the one part may further include other elements.

Composition for Electrochromic Device

A composition for an electrochromic device according to an embodiment of the present invention includes a light-transmitting polymer resin, a cross-linking agent, an initiator, an ionic liquid, and an electrochromic material, wherein the light-transmitting polymer resin is poly(butyl acrylate).

When poly(butyl acrylate) (PBA) is used as a main polymer, optical transmission, flexibility and elasticity may be obtained. In particular, these properties may be further improved when the crosslinking agent, the initiator, and the ionic liquid used in an embodiment of the present invention are used together. A molecular formula of the poly(butyl acrylate) is $(C_7H_{12}O_2)_n$ (n is a natural number), and the formula is as shown in Formula 1 below. A molecular weight of the poly(butyl acrylate) is not particularly limited, but may be 20,000 to 100,000.

[Formula 1]

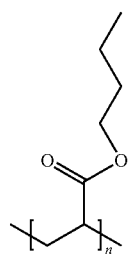

The crosslinking agent forms crosslinks between chains of the light-transmitting polymer and thus serves to improve mechanical properties such as hardness and elasticity and provide chemical stability. The crosslinking agent may preferably be polyethylene glycol dimethacrylate (PEGDA) in order to provide elasticity and flexibility by being bonded to the light-transmitting polymer. A molecular formula of the polyethylene glycol dimethacrylate is $C_3H_5C(O)(OCH_2CH_2)_nOC(O) C_3H_5$ (n is a natural number), and the formula may be Formula 2 below.

[Formula 2]

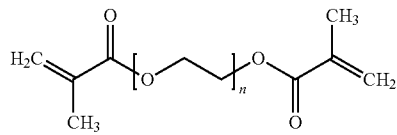

The crosslinking agent may be in an amount of 1 to 2 parts by weight, preferably 1 to 1.4 parts by weight, with respect to 100 parts by weight of the light-transmitting polymer resin. When the amount of the cross-linking agent is too high, optical transmission is reduced, and when the amount of the cross-linking agent is too low, mechanical properties of an electrochromic member are reduced.

The initiator serves to cause a polymerization reaction between the light-transmitting polymer and the crosslinking agent. The initiator may be 1-hydroxycyclohexyl phenyl ketone (PI). A molecular formula of the 1-hydroxycyclohexyl phenyl ketone is $HOC_6H_{10}COC_6H_5$, and the formula may be represented by Formula 3 below.

[Formula 3]

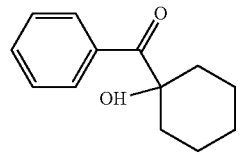

The initiator may be in an amount of 0.5 to 2 parts by weight, preferably 0.8 to 1.2 parts by weight, with respect to 100 parts by weight of the light-transmitting polymer resin. When the amount of the initiator is too large, flexibility and elasticity may be reduced, and when the amount of the initiator is too small, strength may be reduced.

The ionic liquid is a material that may generally remain in a non-volatile liquid state at 100° C. and improve the movement of ions and electrons of an electrochromic member as well. The ionic liquid may be 1-butyl-3-methylimidazolium bis(trifluoromethylsulfonyl)imide (BMIM TFSI). A molecular formula of the 1-butyl-3-methylimidazolium bis(trifluoromethylsulfonyl)imide is $C_{10}H_{15}F_6N_3O_4S_2$, and the formula is shown in Formula 4 below.

[Formula 4]

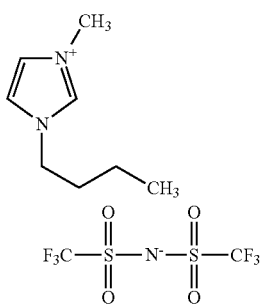

The ionic liquid may be in an amount of 150 to 250 parts by weight, preferably 180 to 220 parts by weight, with respect to 100 parts by weight of the light-transmitting polymer resin. When the amount of the ionic liquid is too low, the ionic conductivity of an ion gel may be reduced, and when the amount is too high, light transmittance may be reduced.

In an embodiment, the composition for an electrochromic device may further include an anode redox compound. The anode redox compound may be any one of ferrocene and dimethyl ferrocene, preferably dimethyl ferrocene. The dimethyl ferrocene may be represented by Formula 5 below.

[Formula 5]

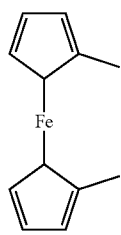

The anode redox compound may be in an amount of 1 to 8 parts by weight with respect to 100 parts by weight of the polymer resin.

The electrochromic material is a material whose color is changed through changes in wavelength absorbed by voltage applied from the outside. In an embodiment of the present invention, various types of electrochromic materials may be used depending on the color to be realized.

The electrochromic material may be 1-heptyl-[4,4'-bipyridine] (hexafluorophosphate) (MHV[$PF_6$]) to obtain a red color or a magenta color. The 1-heptyl-[4,4'-bipyridine] (hexafluorophosphate) may be represented by Formula 6.

[Formula 6]

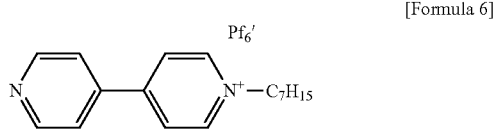

In this case, the electrochromic material may be in an amount of 8 to 15 parts by weight, more preferably 13 to 15 parts by weight, with respect to 100 parts by weight of the light-transmitting polymer resin. When the amount is out of this range, colors may not be well realized or lifespan may be reduced.

The electrochromic material may be 11,1'-diheptyl-[4,4'-bipyridine] bis(hexafluorophosphate) (DHV[$PF_6$]$_2$) to obtain a blue color or a cyan color. The 1,1'-diheptyl-[4,4'-bipyridine] bis(hexafluorophosphate) may be represented by Formula 7.

[Formula 7]

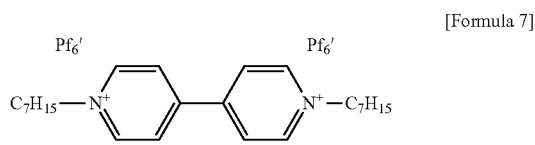

In this case, the electrochromic material may be in an amount of 10 to 20 parts by weight, preferably 16 to 18 parts by weight, with respect to 100 parts by weight of the light-transmitting polymer resin. When the amount is out of this range, colors may not be well realized or lifespan may be reduced.

The electrochromic material may be 3-fluoro-4-(trifluoromethyl)phenyl-[4,4'-bipyridine]hexafluorophosphate (TFMFPhV[$PF_6$]$_2$) to obtain a greenish color. The 3-fluoro-4-(trifluoromethyl)phenyl-[4,4'-bipyridine] hexafluorophosphate may be represented by Formula 8.

[Formula 8]

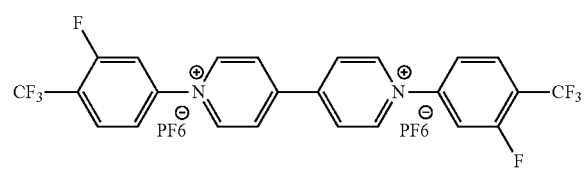

In this case, the electrochromic material may be in an amount of 1 to 10 parts by weight, preferably 6 to 8 parts by weight, with respect to 100 parts by weight of the light-transmitting polymer resin. When the amount is out of this range, colors may not be well realized or lifespan may be reduced.

Electrochromic Device

An electrochromic device according to an embodiment of the present invention includes a first electrode, a second electrode, and an electrochromic device layer that is discolored by voltage applied to the first electrode and the second electrode, and the electrochromic device layer includes an electrochromic member manufactured by the composition for an electrochromic device described above.

The first electrode and the second electrode are ones generally used in electrical devices and are not particularly limited. However, the first electrode and the second electrode may be formed of ITO glass or ITO-PEN to obtain light transmittance, flexibility, and elasticity.

The electrochromic device layer includes the composition for an electrochromic device described above, and may be prepared in an appropriate size and thickness according to a manufacturing method, which will be described later.

Manufacturing Method of Electrochromic Member

A method of manufacturing an electrochromic member includes mixing a light-transmitting polymer resin, a crosslinking agent, an initiator, an ionic liquid, and an electrochromic material to prepare a mixture.

The light-transmitting polymer resin, the crosslinking agent, the initiator, the electrochromic material, and the ionic liquid mixed in the preparing of the mixture are the same as those described above.

In the preparing of the mixture, the crosslinking agent may be in an amount of 1 to 2 parts by weight, the initiator may be in an amount of 0.5 to 2 parts by weight, and the ionic liquid may be in an amount of 150 to 250 parts by weight, with respect to 100 parts by weight of the polymer resin.

In an embodiment, after the preparing of the mixture, curing the mixture may be included. This step may be performed through irradiation of UV light, and may be performed through irradiation with a wavelength of 100 to 400 nm for 2 to 30 minutes.

Manufacturing Example: Preparation of PBA Mixed Ion Gel

Ion Gel 1

0.5 g of PBA as a polymer resin, 0.006 g of PEGDA as a crosslinking agent, and 0.005 g of PI as an initiator were added and mixed. The mixture was photocured for 10 minutes with a UV curer at a wavelength of 365 nm.

Ion Gel 2

The preparation was performed in the same manner as in ion gel 1, except that 0.25 g of BMIM TFSI was further added.

Ion Gel 3

The preparation was performed in the same manner as in ion gel 1, except that 0.5 g of BMIM TFSI was further added.

Ion Gel 4

The preparation was performed in the same manner as in ion gel 1, except that 0.75 g of BMIM TFSI was further added.

Ion Gel 5

The preparation was performed in the same manner as in ion gel 1, except that 1.0 g of BMIM TFSI was further added.

Ion Gel 6

The preparation was performed in the same manner as in ion gel 1, except that 1.25 g of BMIM TFSI was further added.

Experimental Example: Evaporation Test

The ion gels 1 to 6 were cut to a certain size, and maintained at 20 to 27° C. and 19 to 40% RH for 30 days at room temperature to measure the weight of those samples. FIG. 1 shows the results of this experiment. Referring to FIG. 1, it is seen that the weight shows no change even when the amount of ionic liquid in the ion gel increases.

Experimental Example: Tensile Strength-Strain Measurement

Figure 2:
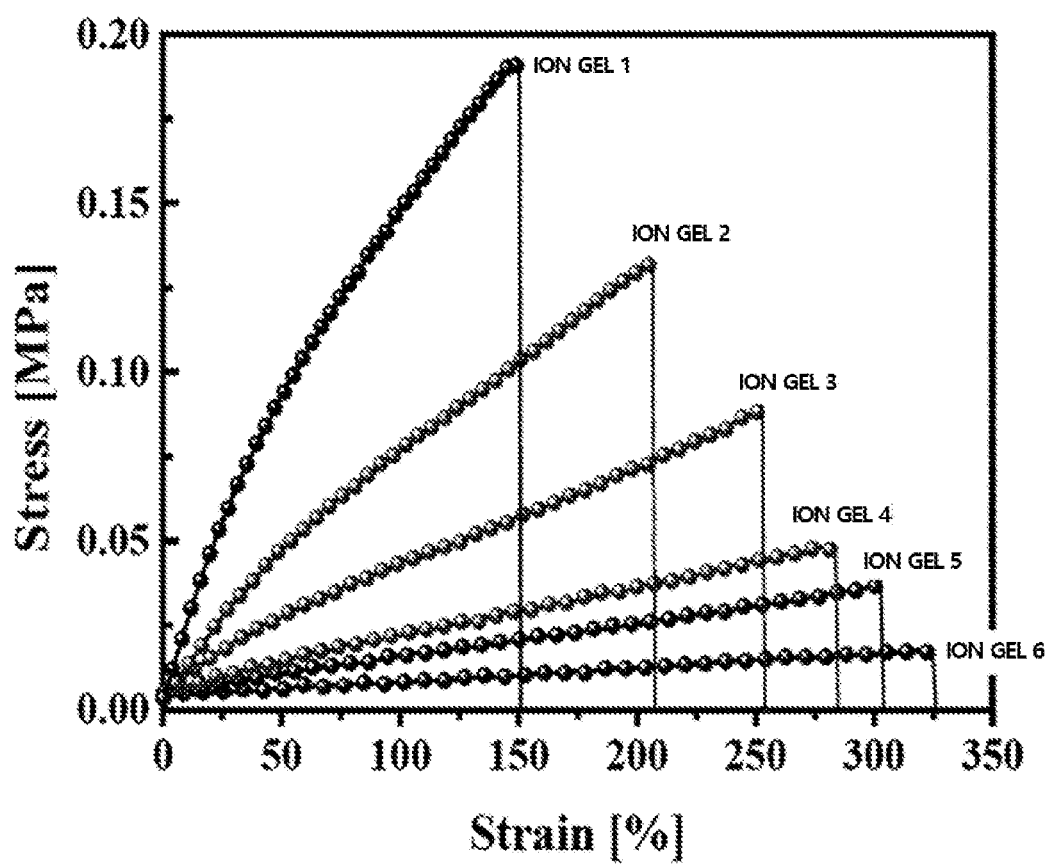
FIG. 2 shows tensile strength-strain measurement results for ion gels 1 to 6.
Figure 3:
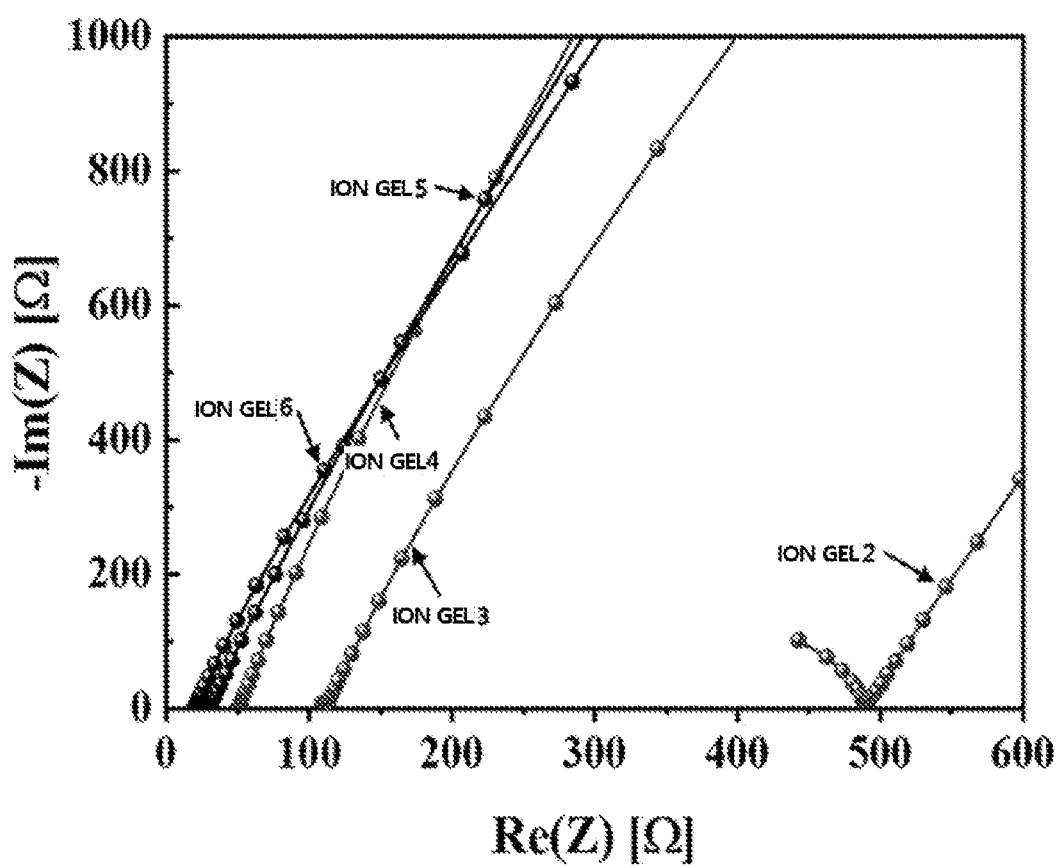
FIG. 3 is a nyquist plot showing impedance experiment results.

The ion gels 1 to 6 were targeted, and measured using a universal testing machine (UTM, Tinius Olsen, H5KT), and the measurement was performed according to ASTM D638 type V. FIG. 2 shows the results of this experiment. Referring to FIG. 2, it is seen that the tensile strength decreases when the amount of ionic liquid increases. The ion gel 5 has the most suitable flexibility and elasticity, but the ion gel 6 has too low tensile strength and is easily broken, and thus is hardly applicable as an electrochromic device. Therefore, it is determined that adding the ionic liquid in an amount of 200 parts by weight with respect to 100 parts by weight of the light-transmitting polymer according to the Ion gel 5 is most suitable.

Experimental Example: Ionic Conductivity Measurement

Figure 4:
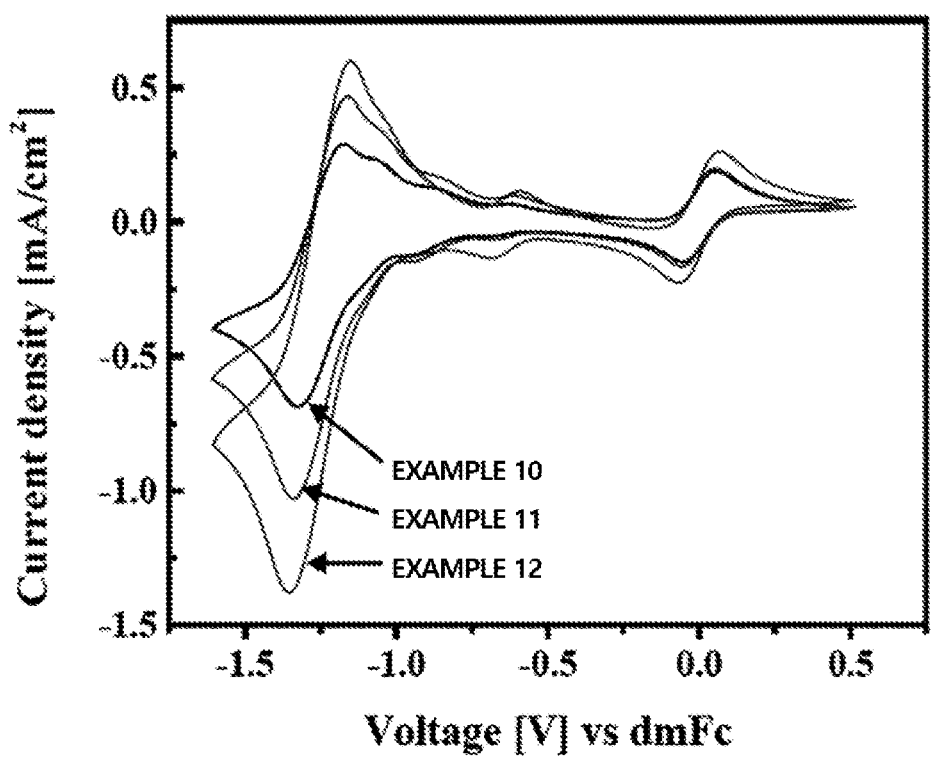
FIGS. 4 to 6 show results of measurement according to cyclic voltammetry.

The electrochromic members prepared in Example and Comparative Example were placed between platinum electrodes, and impedance spectra were measured using an impedance spectrometer. FIG. 4 is a nyquist plot showing the results of this experiment.

Manufacturing Example: Manufacture of Electrochromic Member

Example 1

0.5 g of PBA as a polymer resin, 0.006 g of PEGDA as a crosslinking agent, 0.005 g of an initiator, 1 g of BMIM TFSI as an ionic liquid, 0.04 g of MHV[$PF_2$] as an electrochromic material, and 0.022 g of dimethyl ferrocene as an anode redox compound were mixed.

The mixture was photocured for 10 minutes with a UV curer at a wavelength of 365 nm.

Example 2

Example 2 was performed in the same manner as in Example 1, except that 0.05 g of MHV[$PF_2$] and 0.029 g of dimethyl ferrocene were added.

Example 3

Example 3 was performed in the same manner as in Example 1, except that 0.06 g of MHV[$PF_2$] and 0.036 g of dimethyl ferrocene were added.

Example 4

Example 4 was performed in the same manner as in Example 1, except that 0.06 g of DHV[$PF_6$]$_2$ and 0.022 g of dimethyl ferrocene were added instead of MHV[$PF_2$].

Example 5

Example 5 was performed in the same manner as in Example 4, except that 0.07 g of DHV[$PF_6$]$_2$ and 0.027 g of dimethyl ferrocene were added.

Example 6

Example 6 was performed in the same manner as in Example 4, except that 0.086 g of DHV[$PF_6$]$_2$ and 0.0319 g of dimethyl ferrocene were added.

Example 7

Example 7 was performed in the same manner as in Example 1, except that 0.00965 g of TFMFPhV[$PF_6$]$_2$ and 0.005352 g of dimethyl ferrocene were added instead of MHV [$PF_2$].

Example 8

Example 8 was performed in the same manner as in Example 7, except that 0.0193 g of TFMFPhV[$PF_6$]$_2$ and 0.0107 g of dimethyl ferrocene were added.

Example 9

Example 9 was performed in the same manner as in Example 7, except that 0.0399 g of TFMFPhV[$PF_6$]$_2$ and 0.022 g of dimethyl ferrocene were added.

Manufacturing Example: Manufacture of Electrochromic Device

The previously prepared electrochromic member was cut into 10 mm wide and 20 mm long, and placed on ITO glass, a spacer having a thickness of 100 μm was placed on an edge of the electrochromic member, and then the top was covered with another ITO glass. The electrochromic devices manufactured in this way were defined as Examples 10 to 18 corresponding to electrochromic member Examples 1 to 9, respectively.

Experimental Example: Cyclic Voltammetry Measurement

Figure 5:
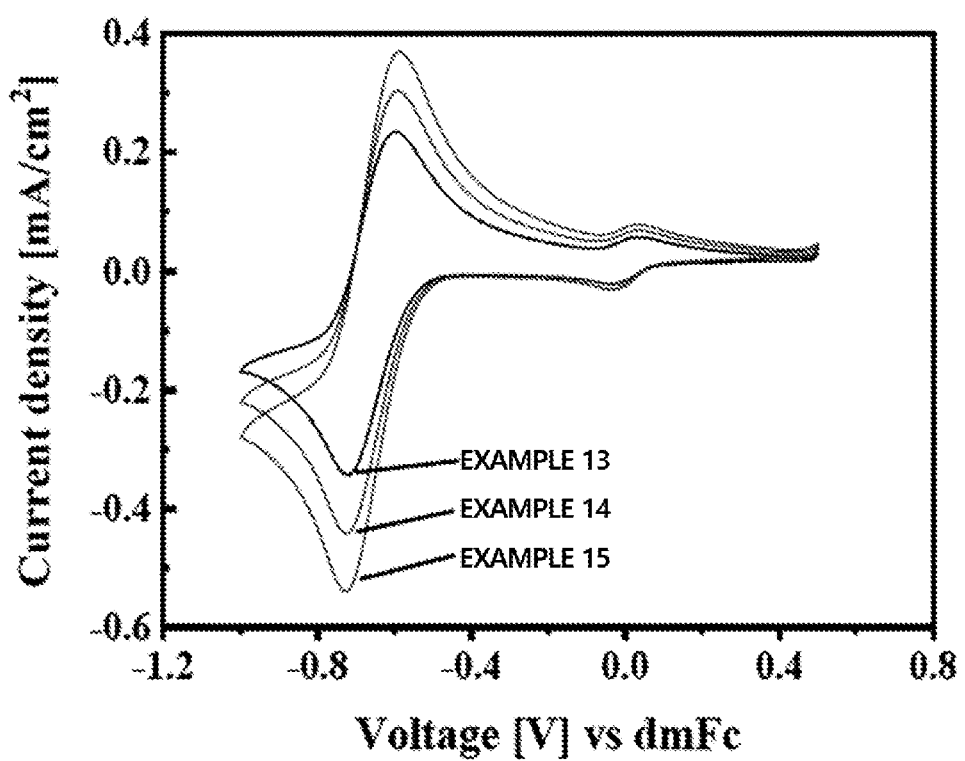
Figure 6:
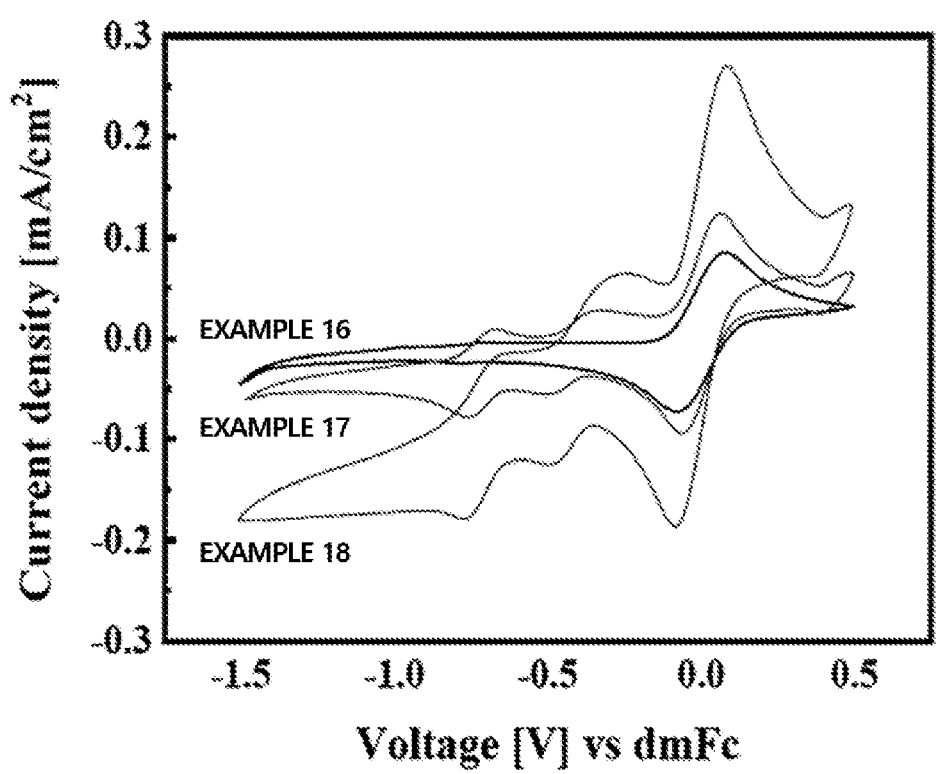

Current/potential curves according to cyclic voltammetry for Examples 10 to 18 were obtained using a biologics (SP240) under the condition of 20 mVs$^{-1}$. FIG. 4 shows the experimental results of Examples 10 to 12, FIG. 5 shows the experimental results of Examples 13 to 15, and FIG. 6 shows the experimental results of Examples 16 to 18. Referring to FIGS. 4 to 6, it is seen that the greater the amount of the electrochromic material, the clearer the change in current.

Experimental Example: Light Absorption Rate Measurement

Figure 7:
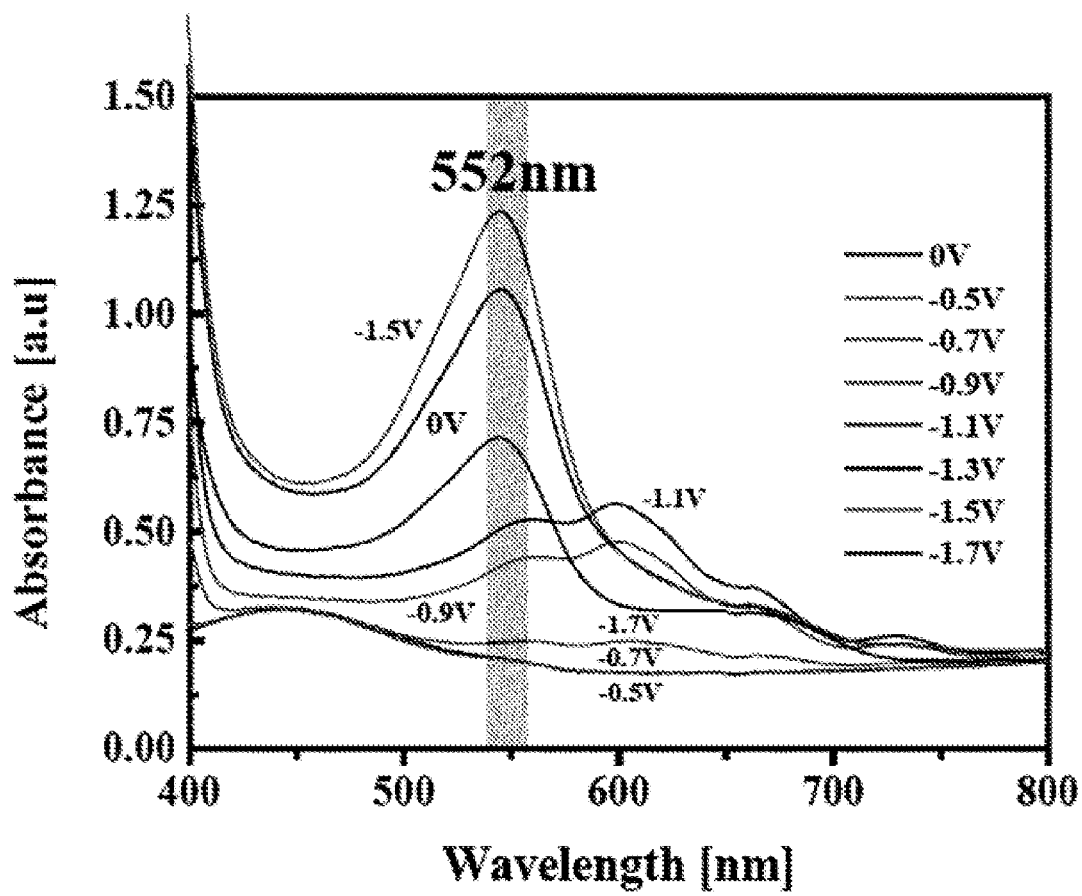
FIGS. 7 to 9 show light absorption rate measurement results.
Figure 8:
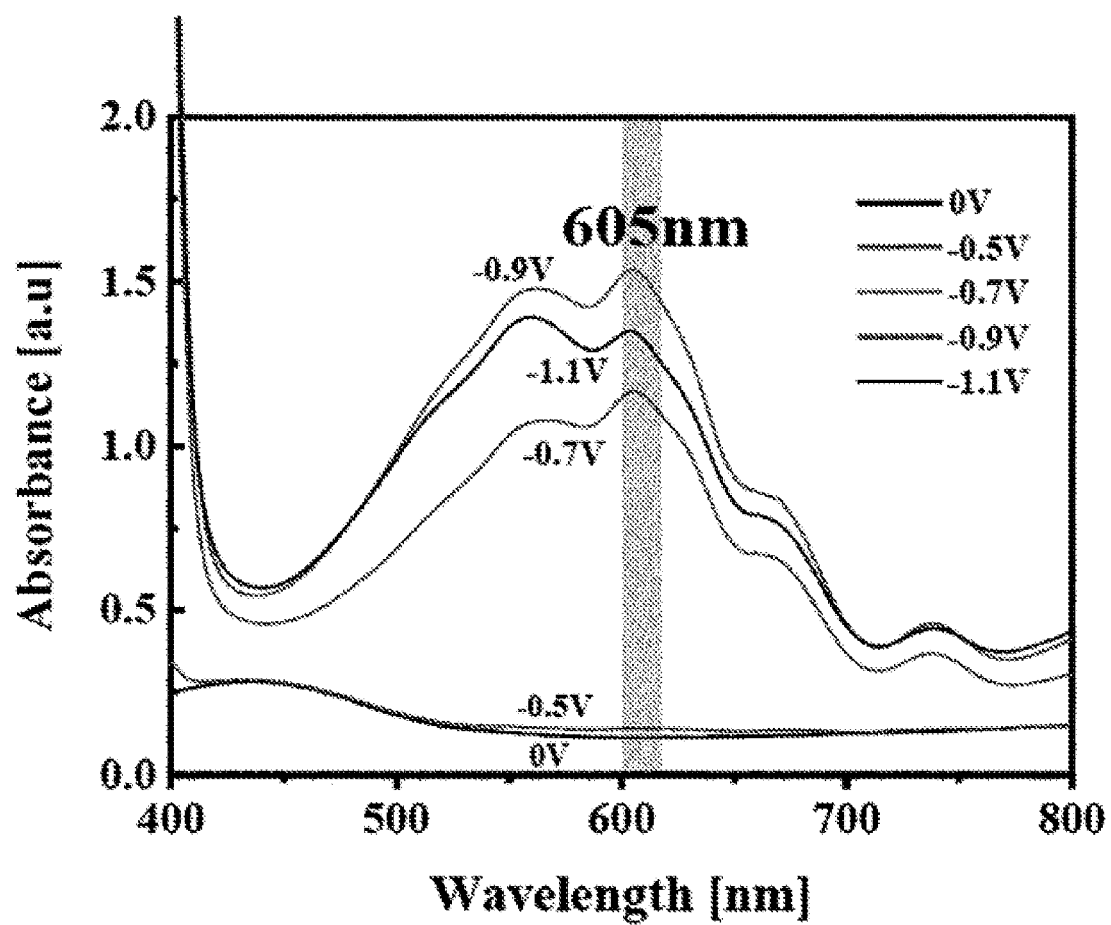
Figure 9:
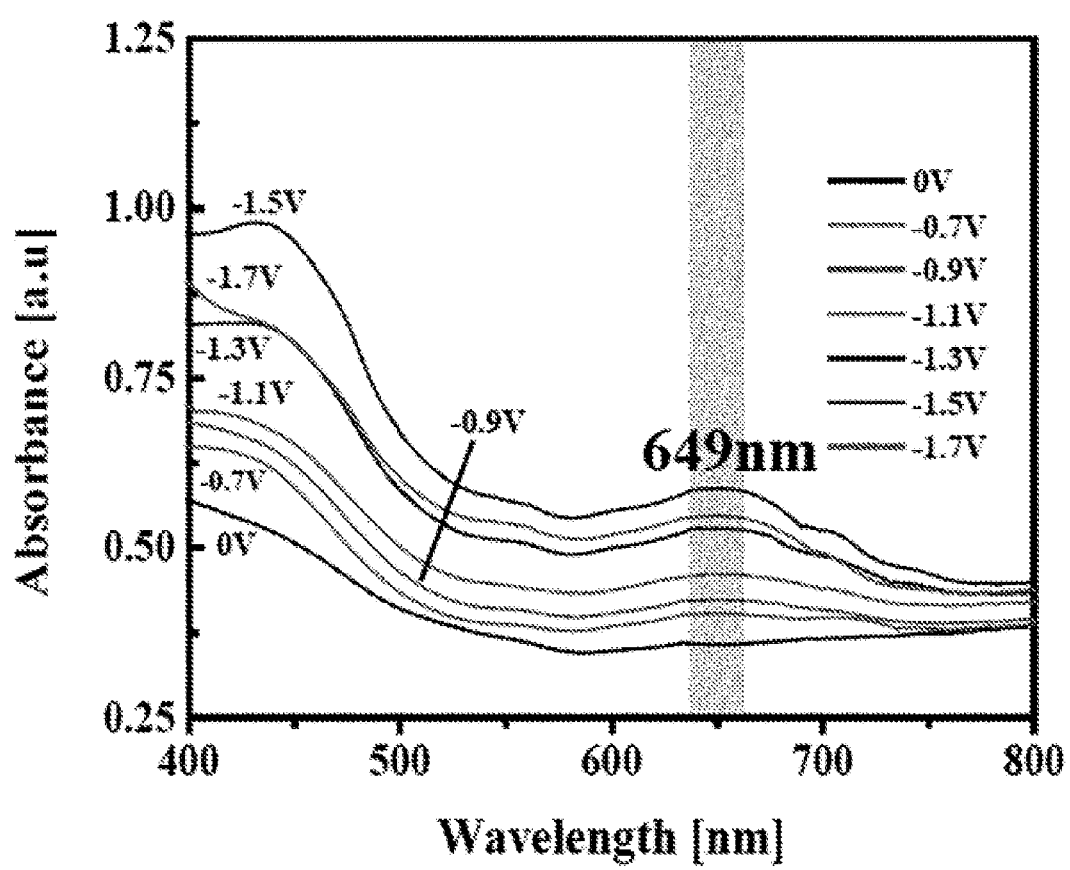

Examples 12, 15 and 18 were measured in the range of 400 to 800 nm using a UV-Vis spectrometer (UV-Vis Spectrometer, Perkin Elmer, Lambda 465). FIGS. 7 to 9 show the experimental results of Examples 12, 15, and 18, respectively. Referring to FIGS. 7 to 9, it is seen that Example 12 has the highest absorption at 552 nm, Example 15 has the highest absorption at 605 nm, and Example 18 has the highest absorption at 649 nm, and the light absorption is regulated according to the applied voltage.

Experimental Example: Decoloring and Coloring Experiments

Figure 10:
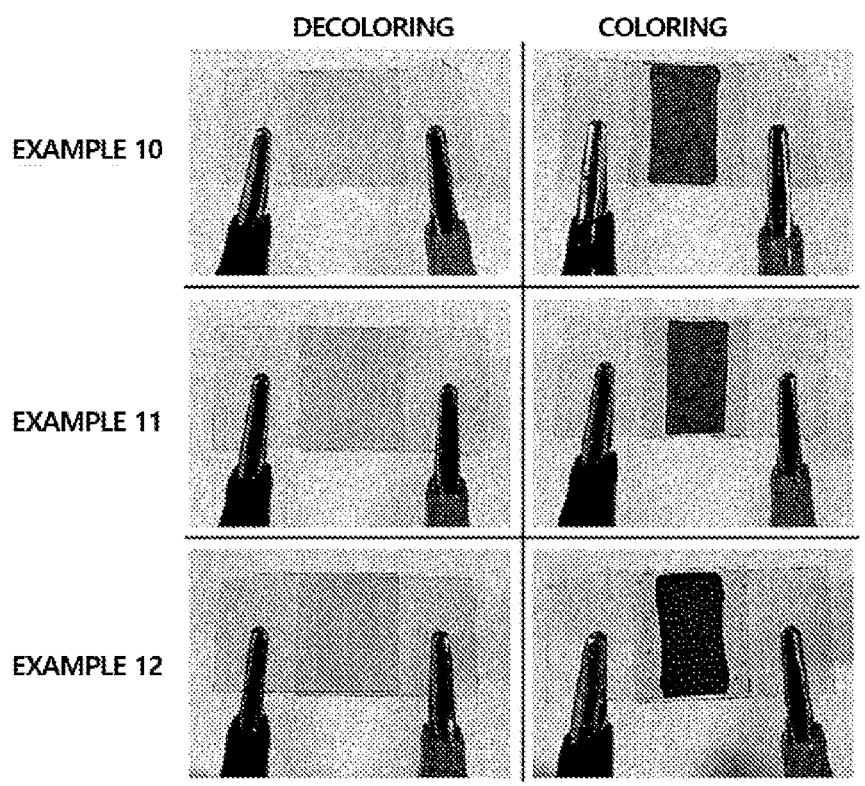
FIGS. 10 to 12 are images showing results of decoloring and coloring experiments.
Figure 11:
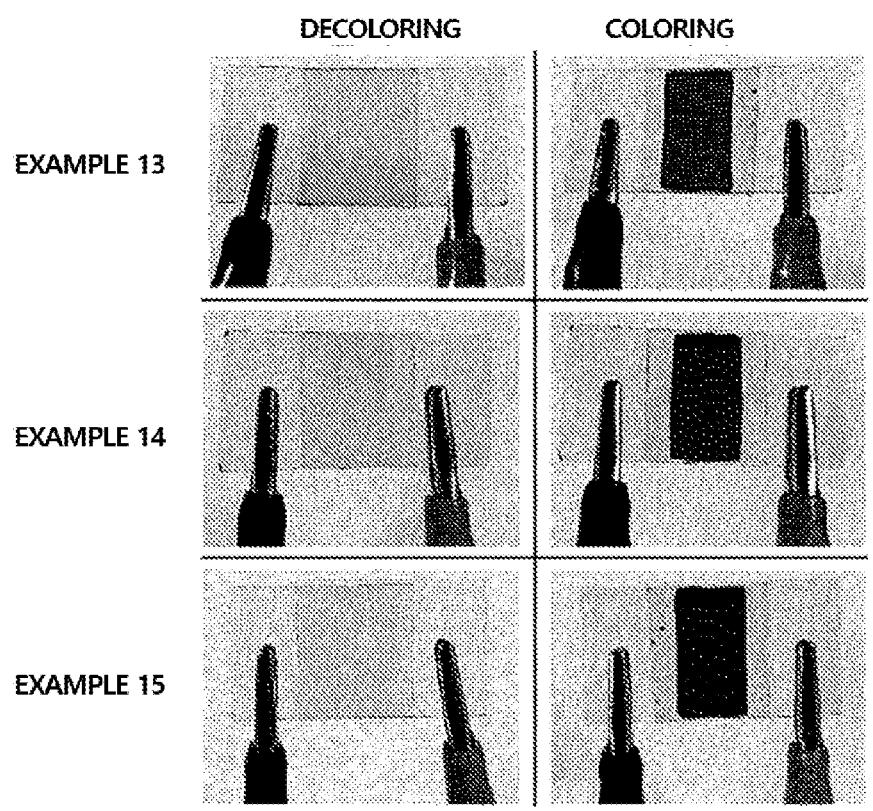
Figure 12:
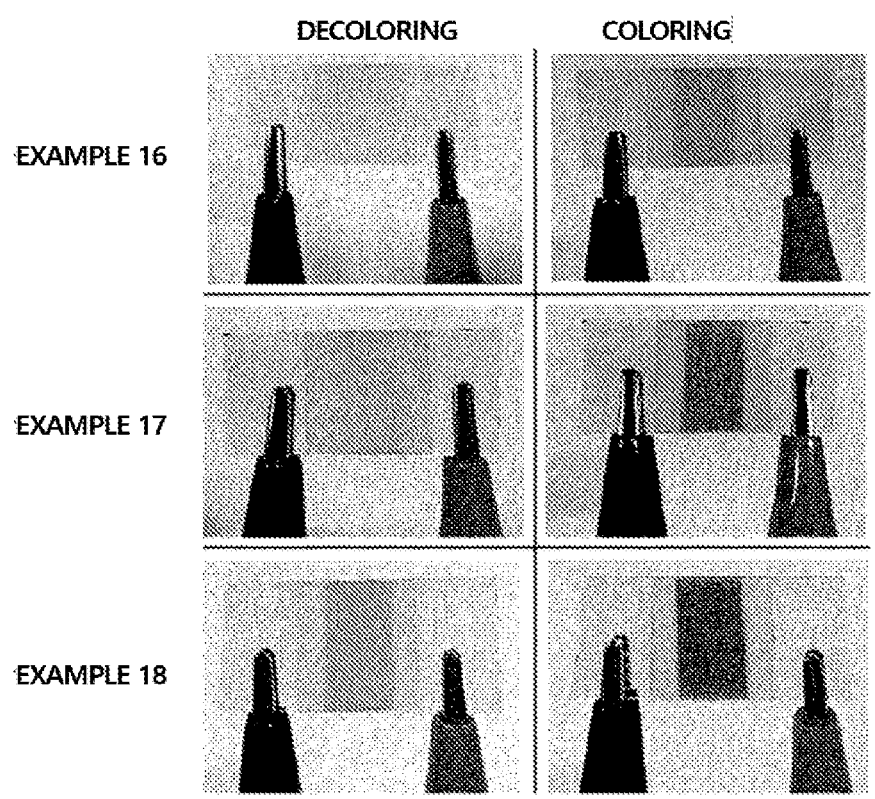

Voltage was applied to Examples 10 to 18 to observe how each color was realized. FIGS. 10 to 12 are images of the experimental results of Examples 10 to 12, Examples 13 to 15, and Examples 16 to 18, respectively. Referring to FIGS. 10 to 12, it is seen that colors are realized according to each electrochromic material, and clearer colors are obtained in Examples 12, 15, and 18.

Experimental Example: Light Transmittance Test

Figure 13:
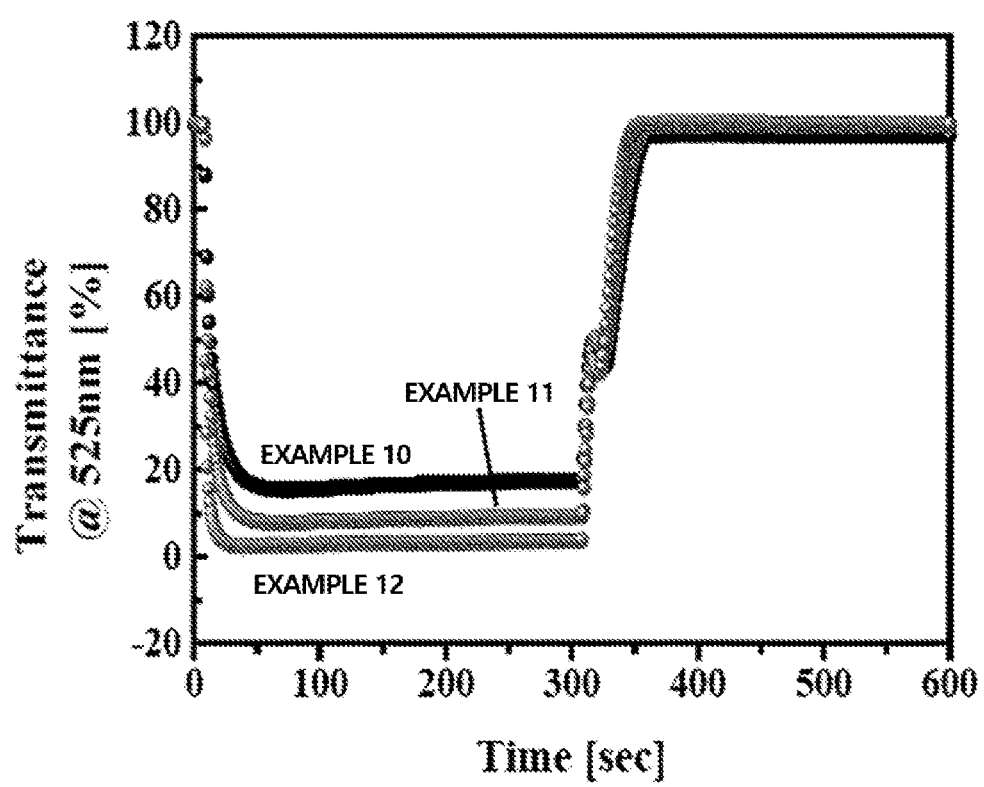
FIGS. 13 to 15 show light transmittance test results.
Figure 14:
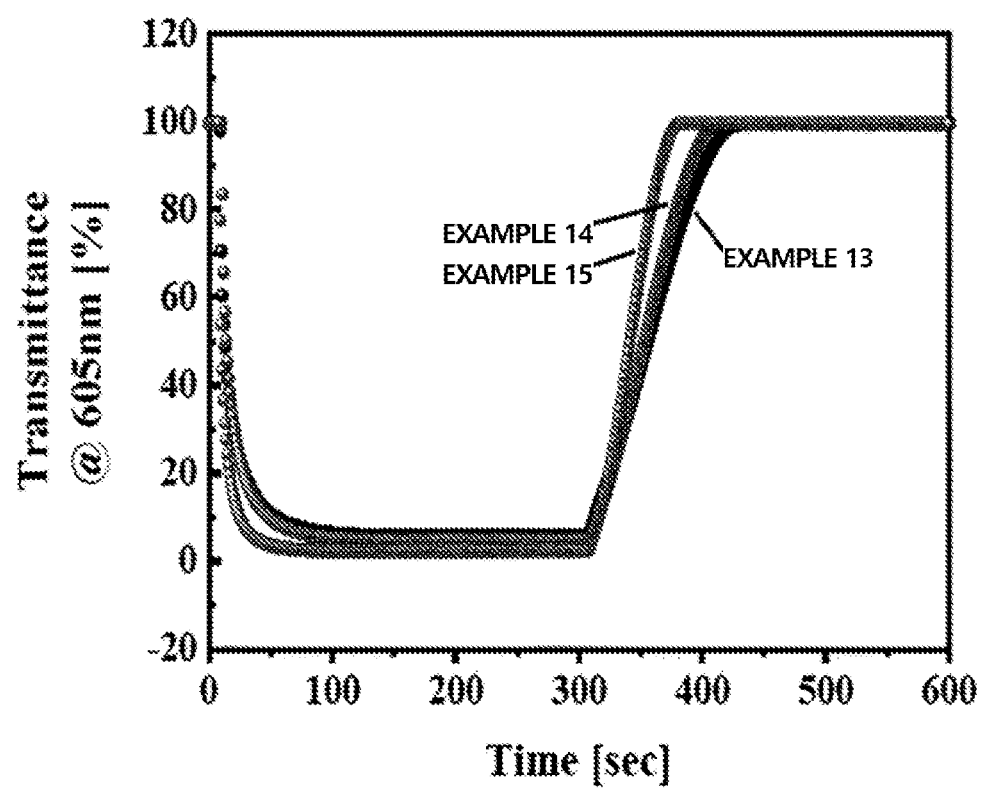
Figure 15:
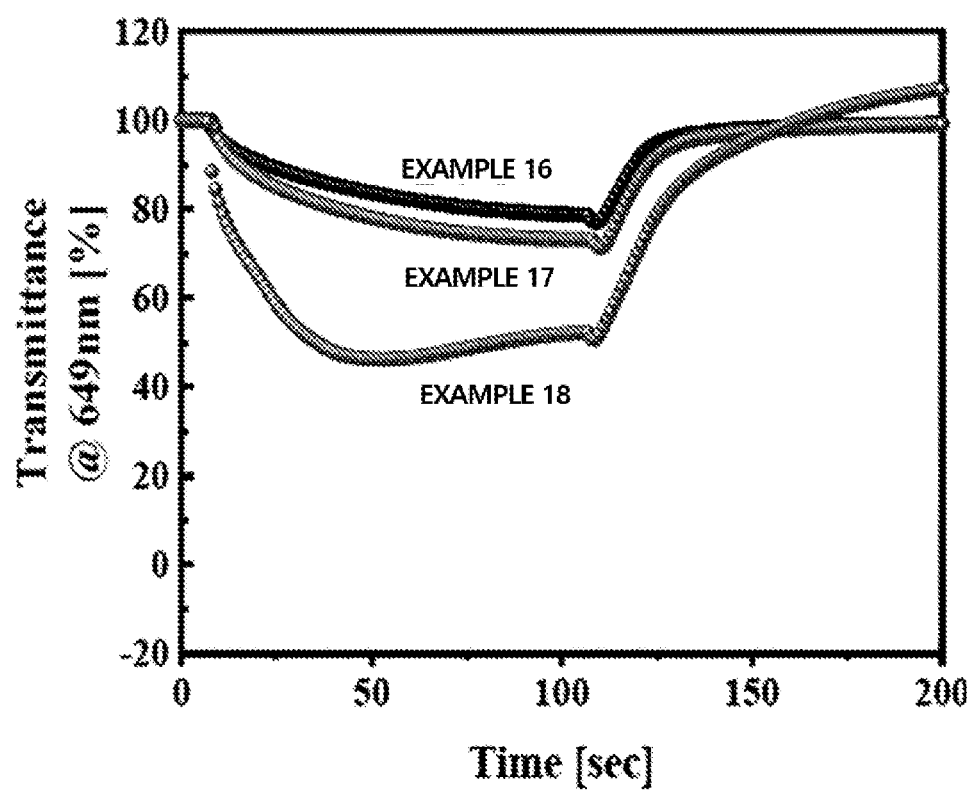

For Examples 10 to 18, a degree of transmittance of light having a wavelength of 525, 605, and 649 nm was measured. In this case, changes in light transmittance was observed during coloring and decoloring by applying and blocking voltage. FIGS. 13 to 15 are images of the experimental results of Examples 10 to 12, Examples 13 to 15, and Examples 16 to 18, respectively. Referring to FIGS. 13 to 15, it is seen that the higher the amount of the electrochromic material, the greater the degree of change in light transmittance, and in particular, the degree of change in light transmittance of Examples 12, 15, and 18 is very excellent.

Experimental Example: Analysis on Optical Density Vs. Charge Density

Figure 16:
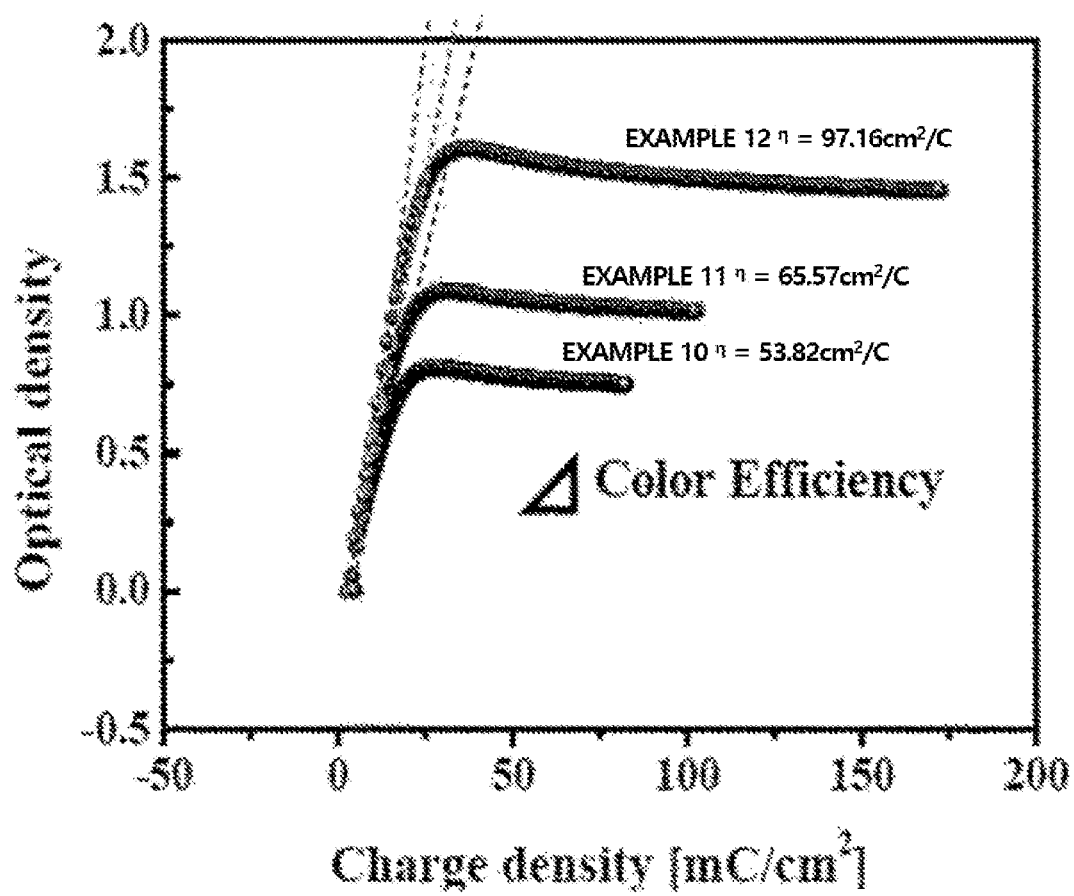
FIGS. 16 to 18 show results of analysis on optical density versus charge density.
Figure 17:
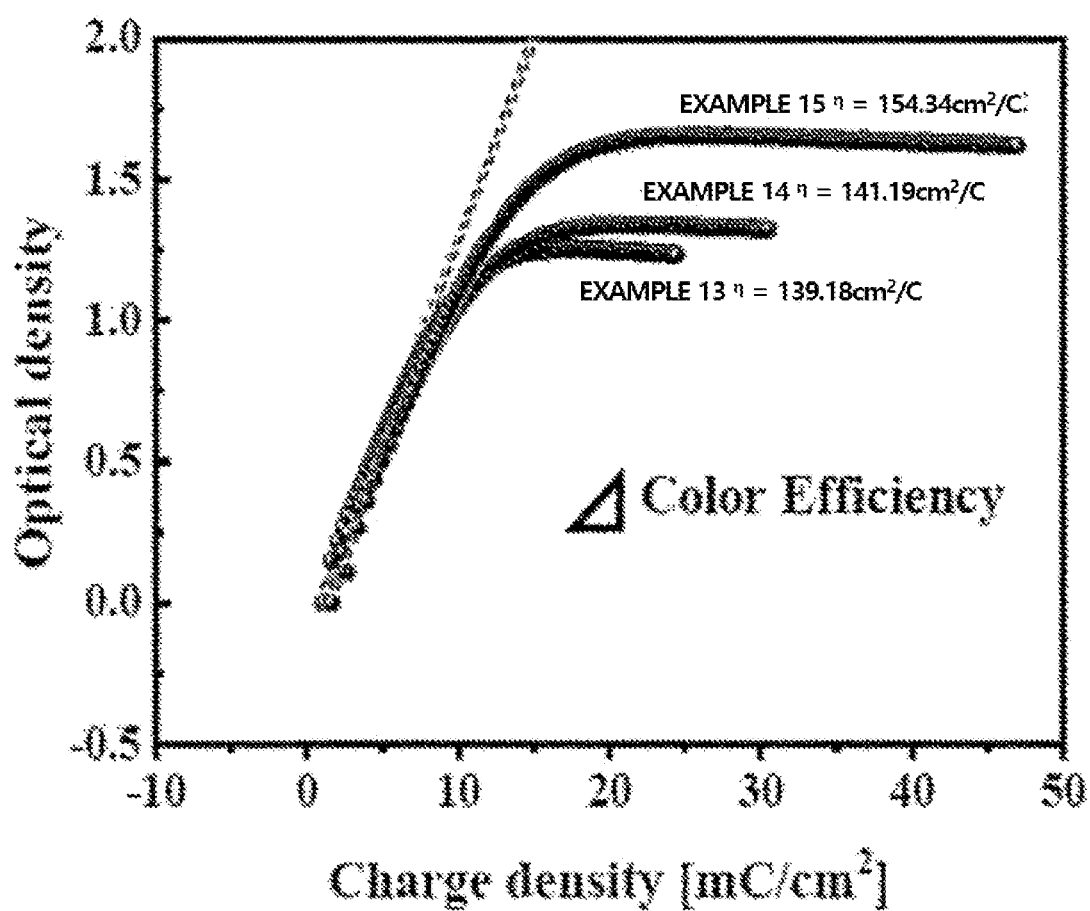
Figure 18:
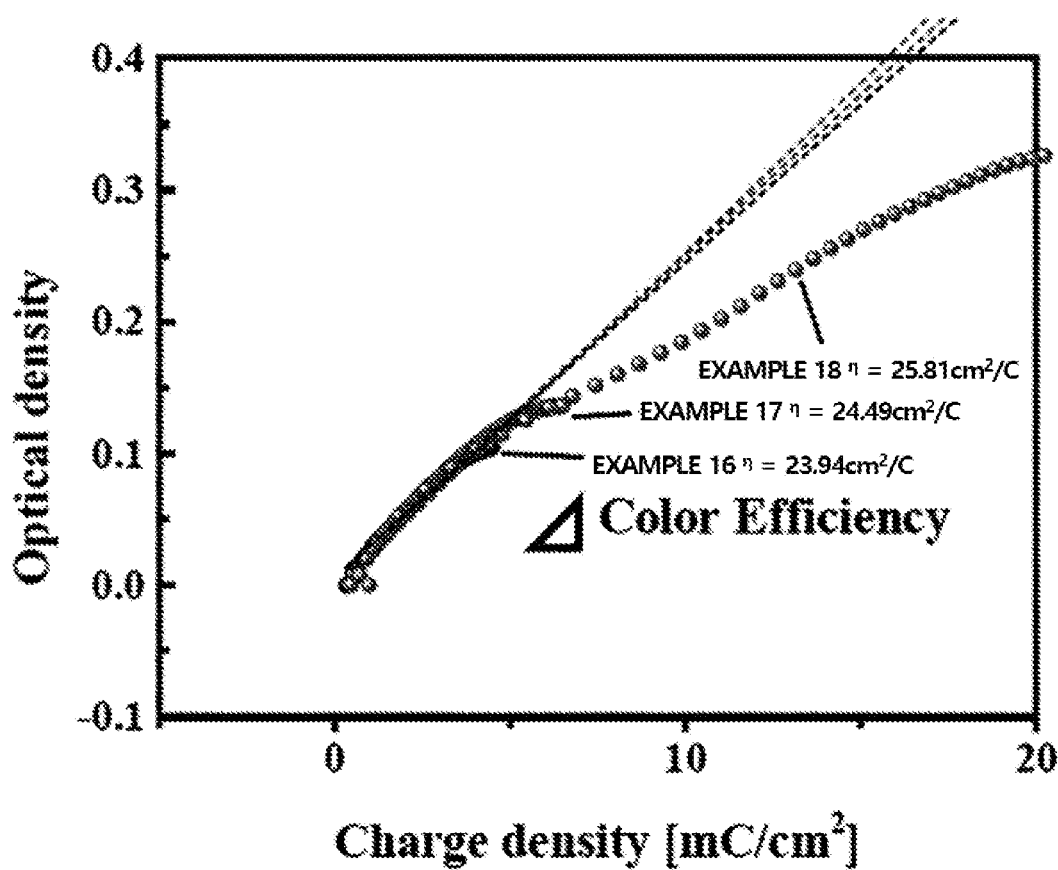

At 606 nm and −1.0 V, the optical density vs. charge density relationship was analyzed for Examples 10 to 18, and coloration efficiency (η) was determined. FIGS. 16 to 18 are images of the experimental results of Examples 10 to 12, Examples 13 to 15, and Examples 16 to 18, respectively. Referring to FIGS. 16 and 17, it is seen that the greater the amount of the electrochromic material, the greater the coloration efficiency (η).

The present invention is not limited to the above-described embodiments and the accompanying drawings, and is intended to be limited by the appended claims. Accordingly, various forms of substitution, modification, and alteration may be made by those skilled in the art without departing from the technical spirit of the present invention described in the claims, which may be also within the scope of the present invention.

The invention claimed is:

1. A composition for an electrochromic device comprising:
    a light-transmitting polymer resin;
    a cross-linking agent;
    an initiator;
    an ionic liquid; and
    an electrochromic material,
    wherein the light-transmitting polymer resin is poly(butyl acrylate),
    wherein the cross-linking agent is polyethylene glycol dimethacrylate, and contained in an amount of 1 to 2 parts by weight with respect to 100 parts by weight of the polymer resin.

2. The composition for an electrochromic device of claim 1, wherein the ionic liquid is 1-butyl-3-methylimidazolium bis(trifluoromethylsulfonyl)imide, and contained in an amount of 150 to 250 parts by weight with respect to 100 parts by weight of the light-transmitting polymer resin.

3. The composition for an electrochromic device of claim 1, further comprising an anode redox compound in an amount of 1 to 8 parts by weight with respect to 100 parts by weight of the light-transmitting polymer resin.

4. The composition for an electrochromic device of claim 1, wherein the electrochromic material is MHV, and contained in an amount of 8 to 15 parts by weight with respect to 100 parts by weight of the light-transmitting polymer resin.

5. The composition for an electrochromic device of claim 1, wherein the electrochromic material is DHV, and contained in an amount of 10 to 20 parts by weight with respect to 100 parts by weight of the light-transmitting polymer resin.

6. The composition for an electrochromic device of claim 1, wherein the electrochromic material is TFMF, and contained in an amount of 1 to 10 parts by weight with respect to 100 parts by weight of the light-transmitting polymer resin.

7. An electrochromic device comprising:
    a first electrode;
    a second electrode; and
    an electrochromic device layer discolored by voltage applied to the first electrode and the second electrode;
    wherein the electrochromic device layer includes the composition for an electrochromic device of claim 1.

8. A composition for an electrochromic device comprising:
    a light-transmitting polymer resin;
    a cross-linking agent;
    an initiator;
    an ionic liquid; and
    an electrochromic material,
    wherein the light-transmitting polymer resin is poly(butyl acrylate),
    wherein the initiator is 1-hydroxycyclohexyl phenyl ketone, and contained in an amount of 0.5 to 2 parts by weight with respect to 100 parts by weight of the light-transmitting polymer resin.

9. The composition for an electrochromic device of claim 8, wherein the ionic liquid is 1-butyl-3-methylimidazolium bis(trifluoromethylsulfonyl)imide, and contained in an amount of 150 to 250 parts by weight with respect to 100 parts by weight of the light-transmitting polymer resin.

10. The composition for an electrochromic device of claim 8, further comprising an anode redox compound in an amount of 1 to 8 parts by weight with respect to 100 parts by weight of the light-transmitting polymer resin.

11. The composition for an electrochromic device of claim 8, wherein the electrochromic material is MHV, and contained in an amount of 8 to 15 parts by weight with respect to 100 parts by weight of the light-transmitting polymer resin.

12. The composition for an electrochromic device of claim 8, wherein the electrochromic material is DHV, and contained in an amount of 10 to 20 parts by weight with respect to 100 parts by weight of the light-transmitting polymer resin.

13. The composition for an electrochromic device of claim 8, wherein the electrochromic material is TFMF, and contained in an amount of 1 to 10 parts by weight with respect to 100 parts by weight of the light-transmitting polymer resin.

14. An electrochromic device comprising:
    a first electrode;
    a second electrode; and
    an electrochromic device layer discolored by voltage applied to the first electrode and the second electrode;
    wherein the electrochromic device layer includes the composition for an electrochromic device of claim 8.

* * * * *